US007057531B1

(12) United States Patent
Okunuga

(10) Patent No.: US 7,057,531 B1
(45) Date of Patent: Jun. 6, 2006

(54) SYSTEM FOR INDICATING APPROACHING VEHICLE SPEED

(76) Inventor: Anthony Okunuga, 46 Heston House, Tanners Hill, London, SE8-4PX (GB)

( * ) Notice: Subject to any disclaimer, the term of this patent is extended or adjusted under 35 U.S.C. 154(b) by 109 days.

(21) Appl. No.: 10/754,798

(22) Filed: Jan. 12, 2004

(51) Int. Cl.
*B60Q 1/54* (2006.01)

(52) U.S. Cl. ....................... 340/936; 340/466; 701/119

(58) Field of Classification Search ................ 340/936, 340/944, 466; 701/119
See application file for complete search history.

(56) References Cited

U.S. PATENT DOCUMENTS 4,591,823 A * 5/1986 Horvat ....................... 340/936
5,289,183 A * 2/1994 Hassett et al. .............. 340/905
D354,047 S 1/1995 Leggate et al.
5,381,155 A * 1/1995 Gerber ....................... 342/104
5,416,711 A 5/1995 Gran et al.
5,617,086 A * 4/1997 Klashinsky et al. ........ 340/907
6,119,065 A 9/2000 Shimada et al.
6,177,889 B1 1/2001 Grande
6,384,740 B1 * 5/2002 Al-Ahmed .................. 340/936
6,809,656 B1 * 10/2004 Mitchell et al. ............ 340/936

* cited by examiner

*Primary Examiner*—Jeffery Hofsass
*Assistant Examiner*—Jennifer Stone

(57) ABSTRACT

A system for indicating approaching vehicle speed includes a transmitter for emitting a wireless signal. The transmitter is mounted on the vehicle. A receiver unit is adapted for detecting wireless signals emitted by the transmitter. A processor is operationally coupled to the receiver unit. The processor is adapted for determining a relative speed of the vehicle from signals received by the receiver unit. At least one display is operationally coupled to the processor for displaying the relative speed determined by the processor.

5 Claims, 4 Drawing Sheets

SYSTEM FOR INDICATING APPROACHING VEHICLE SPEED

BACKGROUND OF THE INVENTION

1. Field of the Invention

The present invention relates to vehicle speed determination devices and more particularly pertains to a new vehicle speed determination device for indicating to pedestrians the speed of oncoming traffic.

2. Description of the Prior Art

The use of vehicle speed determination devices is known in the prior art. While these devices fulfill their respective, particular objectives and requirements, the need remains for a device that displays vehicle speeds to pedestrians who wish to utilize a crosswalk.

SUMMARY OF THE INVENTION

The present invention meets the needs presented above by including a transmitter for emitting a wireless signal. The transmitter is mounted on a vehicle. A receiver unit is adapted for detecting wireless signals emitted by the transmitter. A processor is operationally coupled to the receiver unit. The processor is adapted for determining a relative speed of the vehicle from signals received by the receiver unit. At least one display is operationally coupled to the processor for displaying the relative speed determined by the processor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
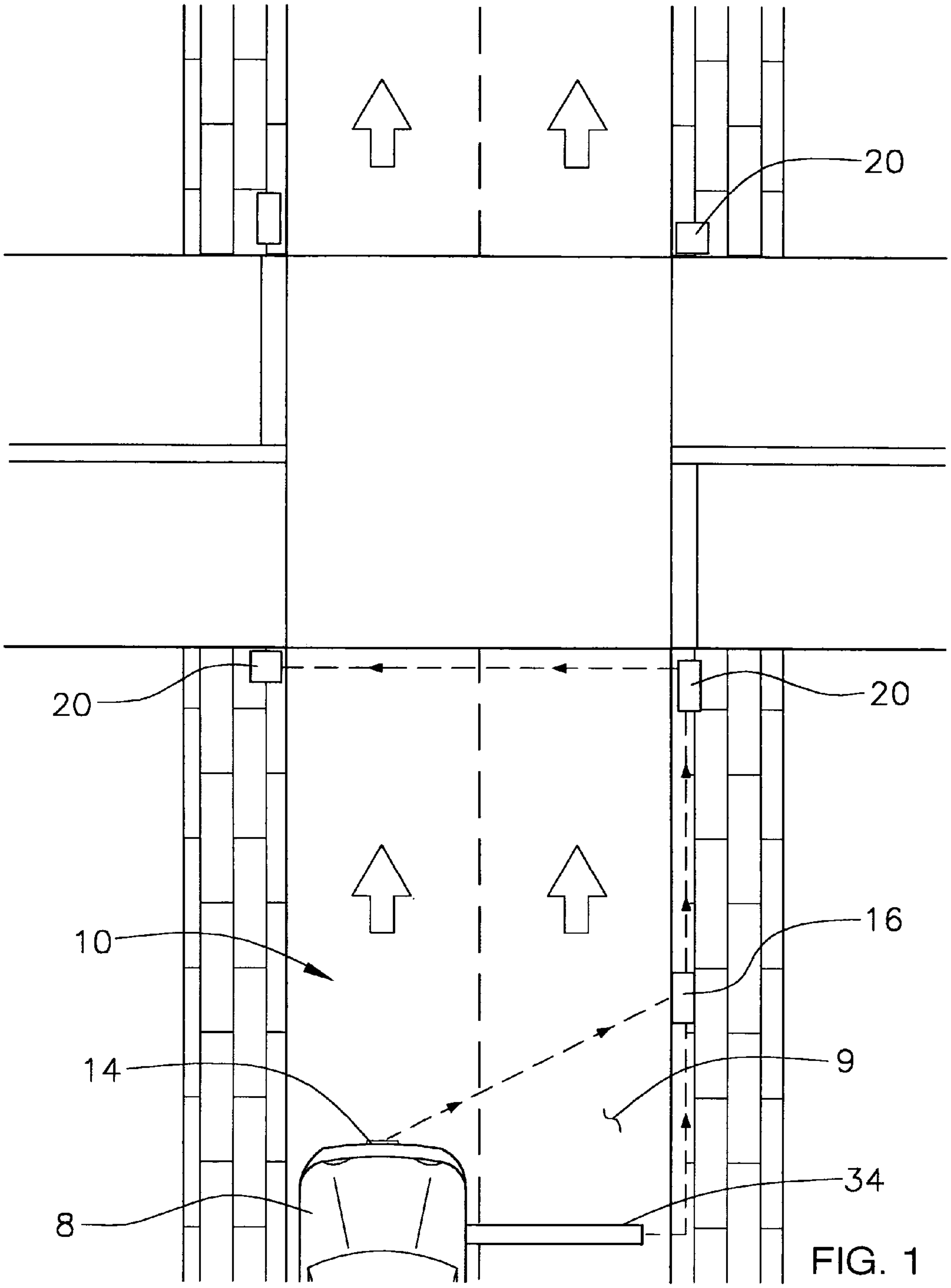
FIG. 1 is a schematic in-use view of a system for indicating approaching vehicle speed according to the present invention.
Figure 2:
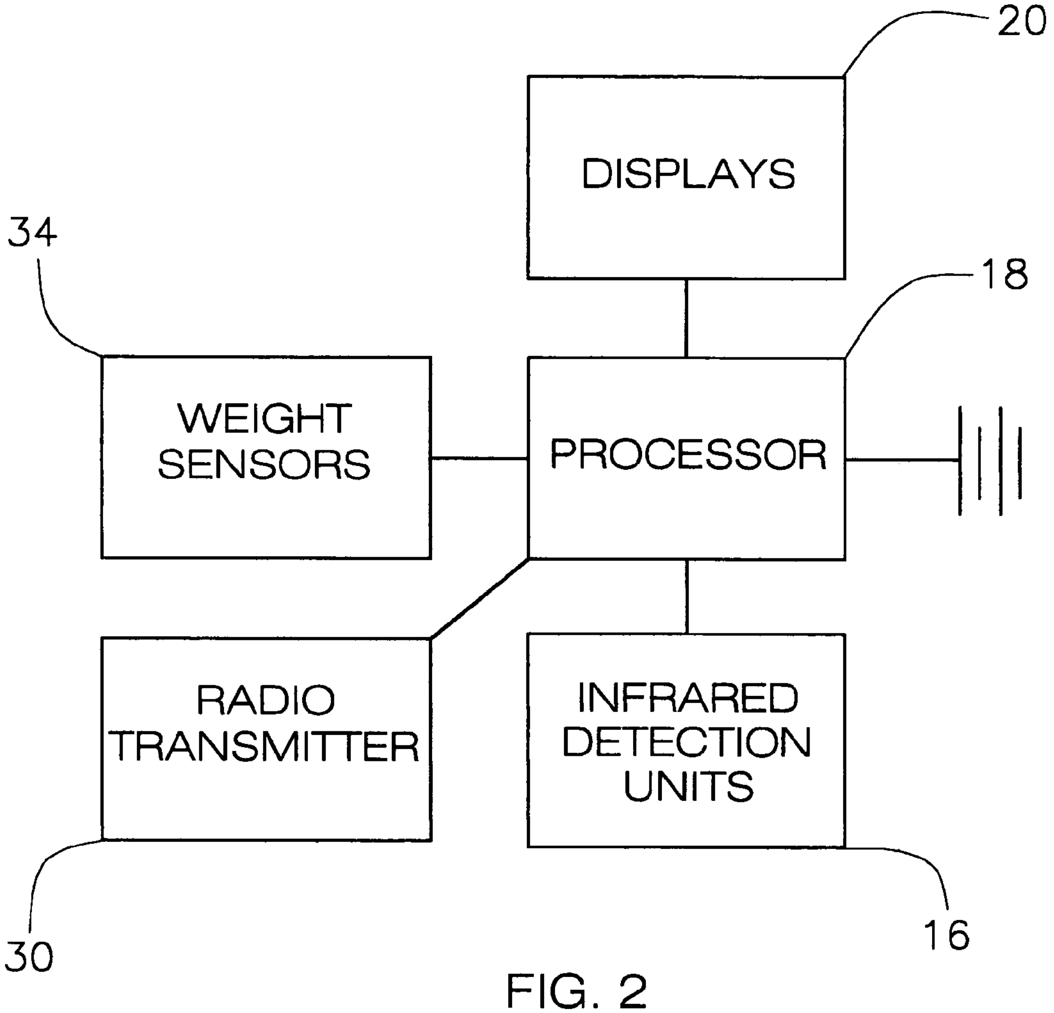
FIG. 2 is an electronic schematic view of the present invention.
Figure 3:
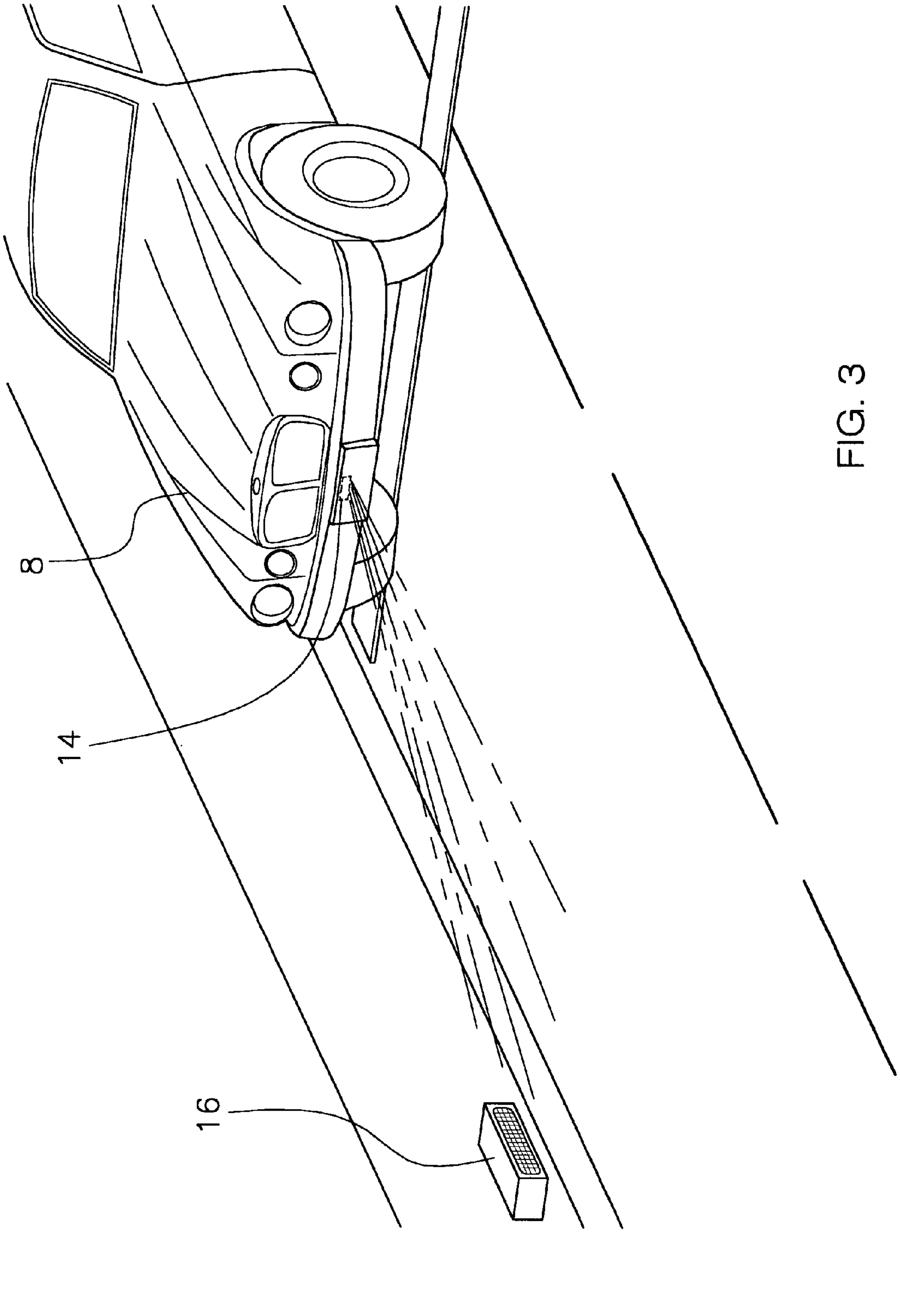
FIG. 3 is a schematic perspective view of the present invention being used.
Figure 4:
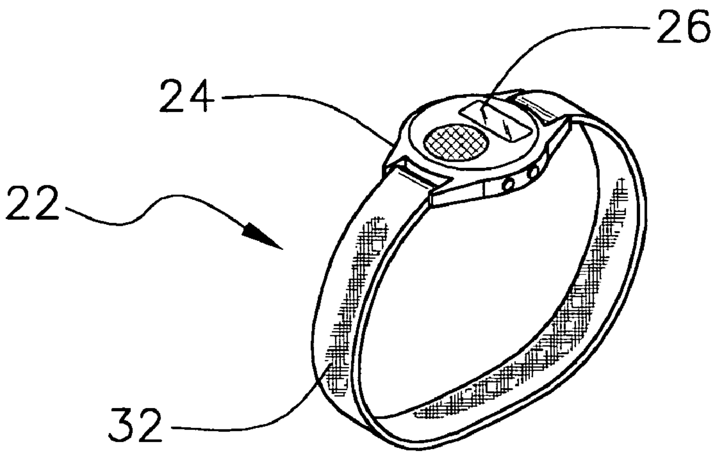
FIG. 4 is a schematic perspective view of the portable display of the present invention.
Figure 5:
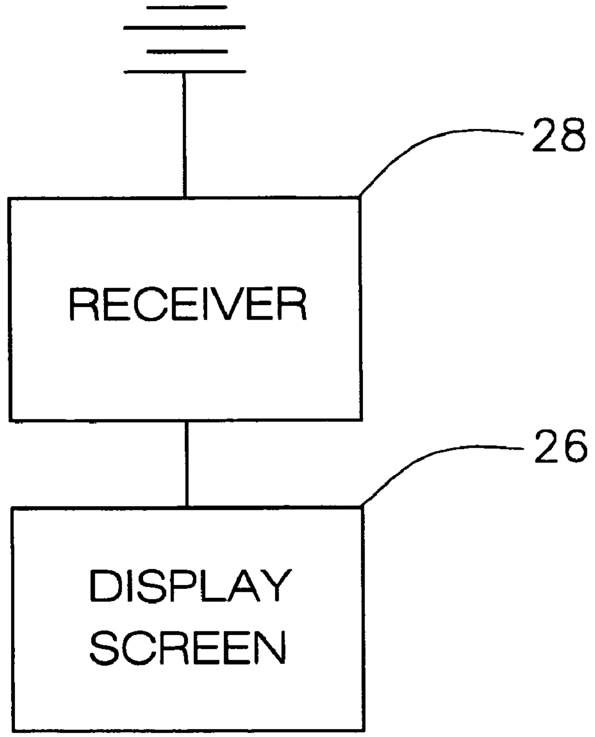
FIG. 5 is an electronic schematic view of the portable display of the present invention.

With reference now to the drawings, and in particular to FIGS. 1 through 5 thereof, a new vehicle speed determination device embodying the principles and concepts of the present invention and generally designated by the reference numeral 10 will be described.

As best illustrated in FIGS. 1 through 5, the system 10 for indicating approaching vehicle speed generally comprises a transmitter 14 for emitting a wireless signal. The transmitter 14 is removably mounted on a vehicle 8. Preferably, the transmitter 14 transmits an infrared signal. It is preferred that the system 10 includes a plurality of transmitters 14 each mounted on a different vehicle 8. In the embodiment including a plurality of transmitters 14, each of the transmitters 14 transmits a different signal so that the system 10 may differentiate between different vehicles 8.

A receiver unit 16 is adapted detecting wireless signals emitted by the transmitter 14. Ideally, the system 10 includes a plurality of receiver units 16 that are each positioned along a roadway 9 and spaced from each other. The receiver units 16 are preferably infrared detection units.

A processor 18 is operationally coupled to the receiver unit 16. The processor 18 is adapted for determining a relative speed of the vehicle 8 from signals received by the receiver unit 16. One way this may be accomplished is by the Doppler effect if only one transmitter 14 is used or it may be determined by the time it takes for the vehicle to pass a pair of consecutively positioned receiver units 16.

At least one display 20 is operationally coupled to the processor for displaying the relative speed determined by the processor 18. The display 20 is preferably a liquid crystal display though any conventional illuminated display may be used. The processor 18 may be operationally coupled to the display 20 either by an electrical connection or a wireless connection. The display 20 preferably includes a plurality of displays 20 which are preferably mounted adjacent to road intersections. The processor 18, by having data including the speed of the vehicle 8 and the distance between the receiving unit 16 and the display 20, is able to determine the estimated time of arrival of the vehicle 8 to the intersection. This estimated time, as well as the speed of the vehicle 8, is preferably shown on the display 20. It is also preferred that the processor 18 have data indicating the speed limit of the road 9 on which the receiving unit 16 is positioned so that is may send a precaution message for displaying on the display 20 that the vehicle is speeding and added caution should be taken.

The system 10 preferably includes a portable display 22 that is positioned in a housing 24. The portable display 22 includes a display screen 26 and a receiver 28 for receiving a radio signal sent by a radio transmitter 30 electrically coupled to the processor 18. Ideally, the housing 24 is positionable on a band 32 and may be worn, as would be a watch. Alternatively, the portable display 22 may be an add-on attachment to an existing watch.

Preferably, at least two weight sensors 34 are positioned in a ground surface, or road 9, upon which the vehicle 8 will be traveling. Each of the weight sensors 34 is operationally coupled to the processor 18 either by an electrical connection or a wireless signal. Each of the weight sensors 34 is positioned such that the vehicle 8 will drive over the weight sensors 34 when the receiver unit 16 is receiving the wireless signal. The processor 18 receives a weight detecting signal from the weight sensors 34 when the vehicle 8 drives on the weight sensors 34 such that the processor 18 may verify the relative speed. Alternatively, the weight sensors 34 may be used for activating the system 10 by turning on the receiving unit 16 and display 20 when a vehicle passes 8 over the weight sensors 34.

In use, the system 10 is primarily used as a warning device for pedestrians who are crossing a road. The system 10 may also be used for warning vehicles of approaching vehicles. The system 10 is particularly useful for those intersections that are blinded to oncoming traffic.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A detection and warning system for indicating an approaching vehicle, said system including:

a transmitter for emitting a wireless signal being mounted on the vehicle;

a receiver unit being adapted for detecting wireless signals emitted by said transmitter;

a processor being operationally coupled to said receiver unit, said processor being adapted for determining a relative speed of the vehicle from signals received by said receiver unit;

at least one display being operationally coupled to said processor for displaying said relative speed determined by said processor; and at least two weight sensors being positioned in a ground surface, each of said weight sensors being operationally coupled to said processor, each of said weight sensors being positioned such that the vehicle will drive over said weight sensors when said receiver unit is receiving the wireless signal, wherein said processor receives a weight detecting signal from said weight sensors when the vehicle drives on said weight sensors such that said processor may verify said relative speed.

2. The detection and warning system of claim 1, wherein said transmitter transmits an infrared signal.

3. The detection and warning system of claim 1, wherein said display displays a precaution message when said relative speed is greater than a speed limit of a road on which the vehicle is traveling.

4. The detection and warning system of claim 1, further including a portable display, said portable display being positioned in a housing, said portable display including a display screen and a receiver for receiving a radio signal sent by a radio transmitter electrically coupled to said processor.

5. The detection and warning system of claim 4, wherein said portable display displays a precaution message when said relative speed is greater than a speed limit of a road on which the vehicle is traveling.

* * * * *